Figure 1:
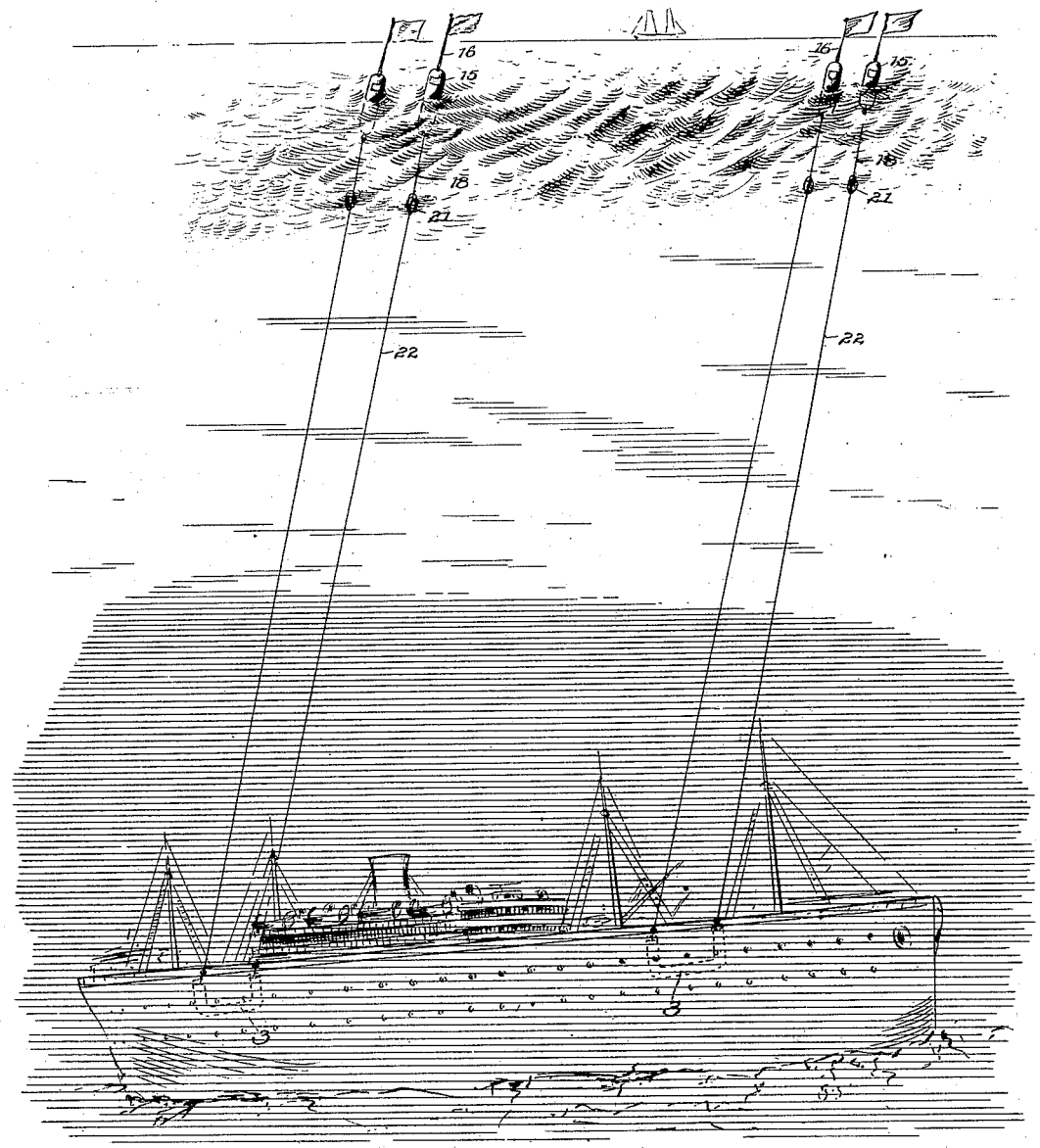

No. 652,412. Patented June 26, 1900.
G. W. THOMAS & J. STRETCH.
APPARATUS FOR LOCATING AND ATTACHING RAISING MEANS FOR SUNKEN VESSELS.
(Application filed Feb. 7, 1900.)
(No Model.) 2 Sheets—Sheet 1.

Witnesses
Harry S. Rohrer
J. M. Cleary

Inventors:
George W. Thomas
Joseph Stretch
By Victor J. Evans
Attorney

No. 652,412. Patented June 26, 1900.
G. W. THOMAS & J. STRETCH.
APPARATUS FOR LOCATING AND ATTACHING RAISING MEANS FOR SUNKEN VESSELS.
(Application filed Feb. 7, 1900.)
(No Model.) 2 Sheets—Sheet 2.
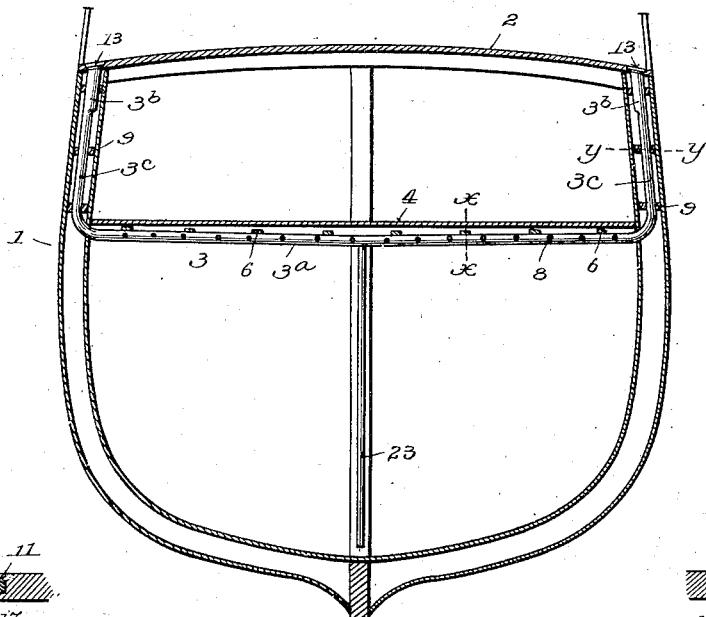
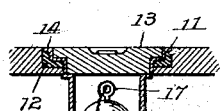
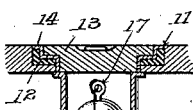
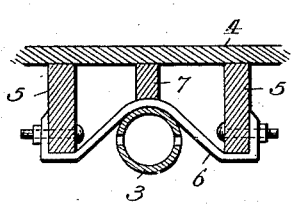
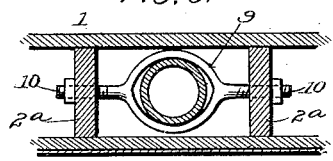
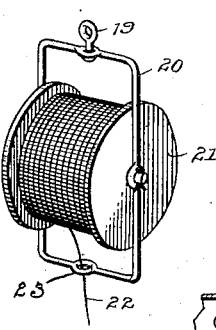
Witnesses:
Harry S. Rohrer.
F. O. McCleary.
Inventors:
George W. Thomas
Joseph Stretch
By Victor J. Evans
Attorney

UNITED STATES PATENT OFFICE.

GEORGE W. THOMAS AND JOSEPH STRETCH, OF EAST ORANGE, NEW JERSEY.

APPARATUS FOR LOCATING AND ATTACHING RAISING MEANS FOR SUNKEN VESSELS.

SPECIFICATION forming part of Letters Patent No. 652,412, dated June 26, 1900.

Application filed February 7, 1900. Serial No. 4,399. (No model.)

*To all whom it may concern:*

Be it known that we, GEORGE W. THOMAS and JOSEPH STRETCH, citizens of the United States, residing at East Orange, in the county of Essex and State of New Jersey, have invented certain new and useful Improvements in Apparatus for Locating and Attaching Raising Means for Sunken Vessels, of which the following is a specification.

Our invention relates to means for locating and raising sunken vessels, the primary object being to provide a signal or indicator adapted to be automatically operated by the submersion of a vessel, thus avoiding the necessity of the employment of divers to locate sunken vessels and attach hoisting-cables thereto. We employ floats or buoys as indicators, and they are carried by the vessel within suitable closed tubes or compartments, the closures of which are adapted to be displaced by the entrance of water to the tubes or compartments to release the floats or buoys.

The characteristic features of this invention and its preferred construction will be fully described hereinafter and defined in the appended claims in connection with the accompanying drawings, which form a part of this specification, and in which—

Figure 1 is a view showing our improved device in use. Fig. 2 is a vertical transverse section through a vessel provided with our invention. Figs. 3 and 4 are longitudinal sections through the vertical portions of the buoy-receiving tube. Fig. 5 is a section on the line $x\ x$, Fig. 2. Fig. 6 is a section on the line $y\ y$, Fig. 2; and Fig. 7 is a detail view of a reel.

Referring to said figures by numerals of reference, 1 is a vessel, to the upper deck 2 of which is secured at a point just inside the port rail a tube 3, which extends downward between the ribs $2^a$ of the vessel and under the lower deck 4, where it is secured between the beams 5 by means of, preferably, iron straps 6, bolted to the beams and bearing upon the upper portion of the tube. We also provide a supplemental brace or beam 7, which is secured between the tube 3 and the deck, serving, with the straps 6, to hold said tube rigidly and securely in position at all times. The tube 3 extends across the width of the vessel 1 and up between the ribs on the starboard side to the upper deck. This tube is provided at its lower or horizontal portion $3^a$ with perforations 8, and the diameter of the tube is enlarged at each end, as at $3^b$, for the purpose hereinafter described. The vertical portions $3^c$ of the tube 3 may be secured to the ribs in any suitable manner. We, however, preferably provide strong metal eyelets 9, adapted to encircle the tube and having oppositely-extending threaded arms 10, which pass through the adjacent ribs $2^a$ and are secured by suitable nuts, as shown.

Within the deck 2, at the points where the tube is secured thereto, are formed passages or openings 11, concentric to and of greater diameter than the ends of the tubes. These openings are countersunk to receive suitable gaskets 12, of rubber or similar material, which are preferably L-shaped in cross-section and serve as a bearing for caps or closures 13, which fit snugly within the openings 11. These caps are preferably formed of wood, having a peripheral metallic band 14, as shown; but the same may be formed of any desired material.

Within each of the enlarged portions of the tube 3 rests a buoy 15, having a flag or other suitable signal 16 suspended therefrom, as shown. This flag, as well as the buoy, may have suitable matter printed or painted thereon indicating the name of the boat, the side of the vessel to which the buoy is secured, &c.

To the upper end of one of the buoys is fastened a swivel 17, having a rope 18 secured thereto. This rope extends downward within the tube and is attached at its opposite end to a swivel 19 of a frame 20, within which is hung a reel 21, having a suitable amount of rope 22 wound thereon. This rope passes through an eye formed in the frame 20 and through the horizontal portion $3^a$ of the tube and is secured to and wound upon a second reel 21 at its opposite end, which is similar in construction, &c., to the one hereinbefore described. The frame 20 of this reel is also provided with a swivel 19, to which is secured a rope 18, connecting the same with the remaining buoy 15.

The portion 3ᵃ of the tube 3 is preferably inclined toward the center, as shown, and at this point is secured a drain-pipe 23, which projects downward to a point near the bottom of the hull. By this means all water draining into the tube 3 from the deck will readily pass downward into the hold.

In operation as the vessel sinks the water rushing into the hold will press upward through the perforations 8 into the tube 3, forcing the caps or closures 13 outward from their seats and releasing the buoys 15. These will immediately rise to the surface of the water, drawing the reels 20 therewith, which will unwind as they move upward. It will be understood that the buoys will become inverted upon reaching the surface, thereby displaying the signal-flags, as is obvious. By providing swivels, as shown, twisting of the ropes is prevented. It will of course be understood that the reel 21 and its frame 20 are free to revolve or slide within the tube 3 at all times.

When it is desired to raise the sunken vessel, either one of the buoys is removed and a strong cable secured to the rope 22. The cable is then drawn through the tube 3 and to the surface again by hauling upon the opposite end of the rope 22. As before stated, the flags and buoys may have suitable matter thereon, as the name of the vessel and instructions to the parties reporting the sinking of the same, &c.

It will be seen that our improved apparatus is neat and substantial in construction and is not exposed to view or in the way at any time, as the same occupies space that would be otherwise wholly unused.

Any number of tubes and buoys may be employed, according to the size of the vessel.

In the foregoing description we have shown the preferred form of our invention; but we do not limit ourselves thereto, as we are aware that modifications may be made therein without departing from the spirit or sacrificing the advantages thereof, and we therefore reserve the right to make such changes as fairly fall within the scope of our invention.

Having thus fully described our invention, what we claim as new, and desire to secure by Letters Patent, is—

1. In an apparatus of the character described, the combination with a vessel, of a buoy-receptacle therein, buoys therein adapted to be automatically discharged by water admitted to the receptacle, and a connection between the buoys extending through the receptacle.

2. In an apparatus of the character described the combination, with a vessel, of a buoy-receptacle therein having a water-inlet thereto, buoys therein adapted to be automatically discharged by water admitted to the receptacle, and a flexible and extensible connection between the buoys extending through, and detachable from, the receptacle.

3. In an apparatus of the character described the combination, with a vessel, of a transversely-extending tube secured therein and having outlets in the deck thereof, a closure for each of said outlets, enlarged portions to said tube, a buoy seated within each enlarged portion, a reel within the tube and a rope wound thereon and connected to the buoys, said closures, and the contents of the tube, adapted to be automatically discharged by the admission of water to the tube through perforations therein.

4. In an apparatus of the character described the combination, with a vessel, of a transversely-extending perforated tube therein having vertical end portions provided with outlets in the deck of said vessel, closures for said outlets, a buoy seated in each vertical end portion of said tube, a reel in each of said portions, a rope wound thereon and connecting the same, and a flexible connection between the reels and buoys, the closures, reels and buoys adapted to be automatically discharged by the admission of water through the perforations of the tube.

5. In an apparatus of the character described the combination, with a vessel, having an upper and a lower deck, of a tube beneath, and extending transversely of, the lower deck, upwardly-extending end portions to the tube, between the ribs of the vessel and means for securing said tube in position, a buoy, and a flexible connection between said tube and buoy.

6. In an apparatus of the character described the combination, with a vessel, having an upper and a lower deck, of a tube beneath and extending transversely of, the lower deck, deck-beams at each side of said tube, straps secured to the beams and bearing upon the upper surface of the tube, upwardly-extending end portions to the tube, between the ribs of the vessel, eyelets encircling the end portions and oppositely-extending arms thereto secured to the ribs, a buoy, and a flexible connection between said tube and buoy.

7. In an apparatus of the character described the combination, with a vessel, having an upper and a lower deck, of a perforated tube secured between the beams of said lower deck, upwardly-extending end portions to the tube secured between the ribs of the vessel and having outlets in the upper deck thereof, closures for said outlets, a buoy seated within each end portion of the tube, said buoys connected by ropes, and reels for said ropes, said buoys and reels adapted to be discharged by the admission of water to said tube through the perforations.

8. In an apparatus of the character described the combination, with a vessel, of a transversely-extending tube secured therein and having outlets in the deck thereof, a closure for each of said outlets, enlarged end portions to the tube, a perforated, horizontal portion and a drain extending from the horizontal portion, a buoy, and a flexible connection between said tube and buoy.

In testimony whereof we affix our signatures in presence of two witnesses.

GEORGE W. THOMAS.
JOSEPH STRETCH.

Witnesses:
CHAS. H. BEST,
WILLIAM KEATING.